J. W. FLEMMING.
PORTABLE LATHE.
APPLICATION FILED OCT. 28, 1908. RENEWED JAN. 19, 1910.
952,564.
Patented Mar. 22, 1910.
2 SHEETS—SHEET 2.
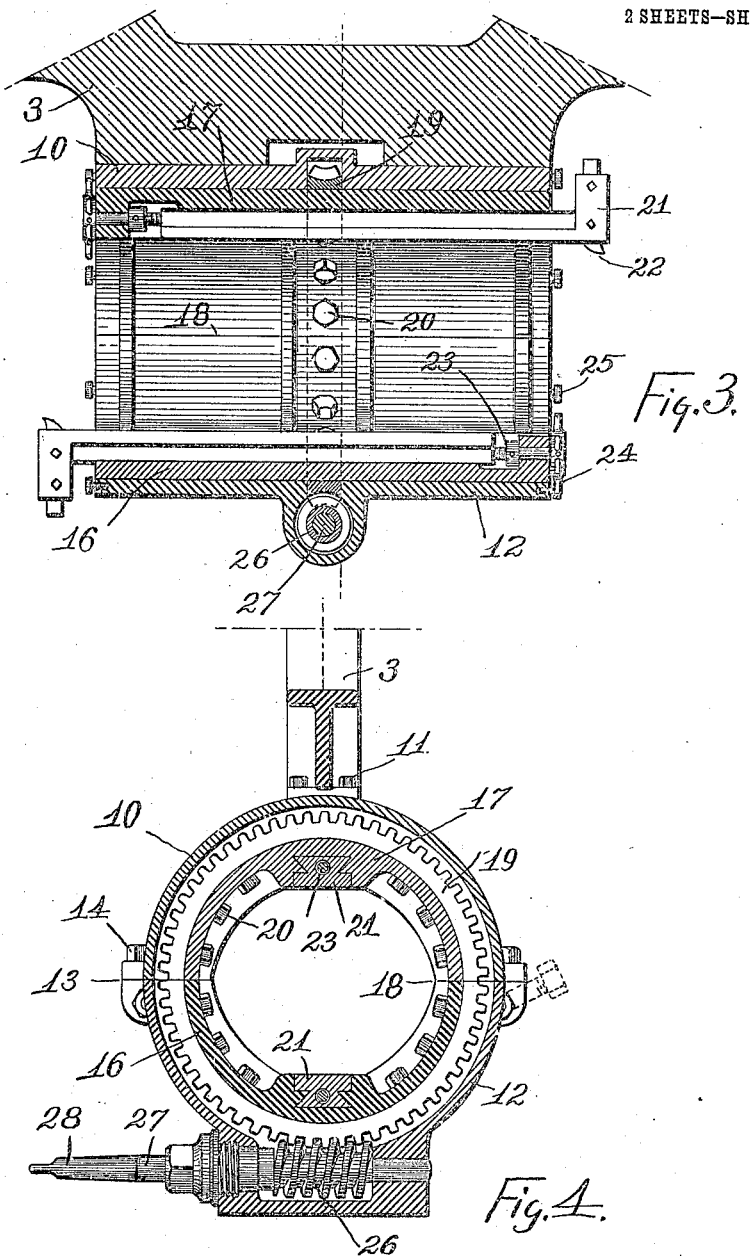
Witnesses:
Elmer R. Shipley.
M. S. Belden.
Inventor
John William Flemming
by James W. See
Attorney

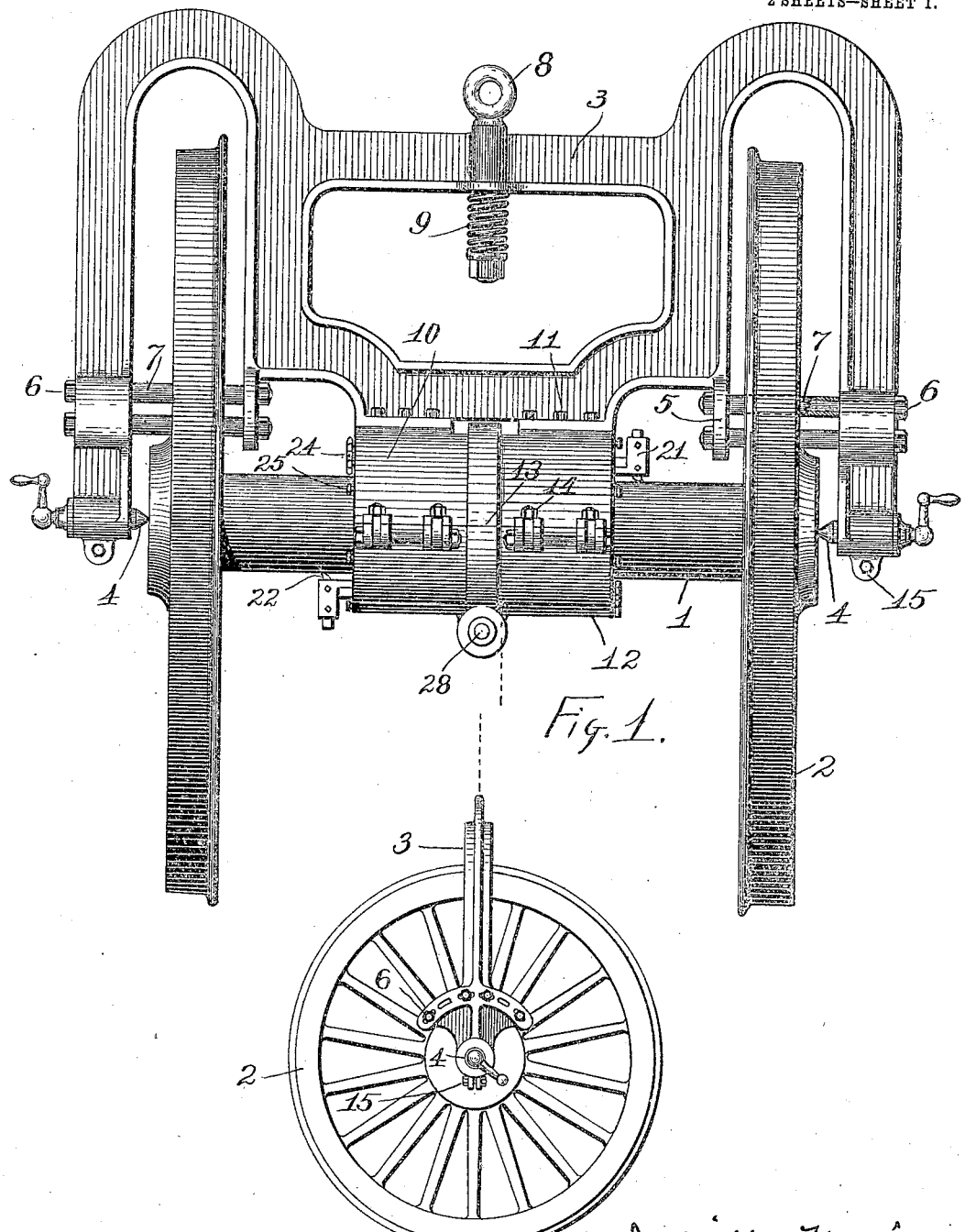

UNITED STATES PATENT OFFICE.

JOHN WILLIAM FLEMMING, OF ALBANY, NEW YORK.

PORTABLE LATHE.

952,564. Specification of Letters Patent. Patented Mar. 22, 1910.

Application filed October 28, 1908, Serial No. 459,841. Renewed January 19, 1910. Serial No. 538,911.

*To all whom it may concern:*

Be it known that I, JOHN WILLIAM FLEMMING, a citizen of the United States, residing at Albany, Albany county, New York, have invented certain new and useful Improvements in Portable Lathes, of which the following is a specification.

This invention relates to improvements in that class of portable lathes designed for use in dressing the journals of the driving axles of locomotives while the wheels are on the axles.

The improvements will be readily understood from the following description taken in connection with the accompanying drawings in which:—

Figure 1 is a front elevation of a structure embodying my improvements: Fig. 2 an end elevation of the same: Fig. 3 a vertical longitudinal section of the hollow tool-carrying arbor and its bearing: and Fig. 4 a vertical transverse section of the arbor and its bearing.

A diversity of scales is involved in the drawings.

In the drawings:—1, indicates a locomotive driving-axle: 2, the driving wheels fast thereon: 3, the lathe frame, in the form of an arch straddling the wheel and axle structure and having a central portion extending down between the wheels: 4, endwise adjustable centers carried by the outer portions of the lathe frame and engaging the centers of the axle, whereby the lathe frame is accurately positioned relative to the axle and held thereto: 5, inward portions of the lathe frame disposed between the wheels and opposite the outer arms thereof: 6, bolts extending through frame portions 5 and the outer arms and passing between spokes of the wheels: 7, sleeves on these bolts, acting as distance pieces to prevent the arms being drawn inwardly by the strain of the bolts: 8, an eye socketed into the upper portion of the lathe frame and adapted to receive a crane hook or other handling appliance: 9, a spring connected with the lathe frame and eye in such manner that the lathe frame may be supported with some degree of elasticity: 10, a half-bearing connected with the central part of that portion of the lathe frame lying between the driving wheels, the bore of this half-bearing being concentric with the centers 4: 11, bolts uniting the half-bearing 10 to the lathe frame: 12, the second half-bearing: 13, the joint of separation between the two half-bearings, this joint being preferably in a plane at right angles to the general plane of the lathe frame: 14, joint-bolts, illustrated as of swinging type, clamping the two half-bearings together to form a complete bearing concentric with centers 4: 15, binder screws in the outer arms of the lathe frame, to serve in binding the centers 4 after adjustment: 16, one-half of the hollow arbor turning in the bearing: 17, the other half of the hollow arbor: 18, the joint of separation between the two halves of the arbor: 19, a ring-gear, illustrated as of worm type, formed in two halves and encircling the hollow arbor and secured to it, this gear seating in an annular groove formed in the bearing: 20, bolts securing the halves of the ring-gear to the halves of the arbor: 21, tool slides fitted for longitudinal movement in grooves in the bore of the arbor, one tool slide being fitted in each of the arbor-halves, the end of one tool slide projecting outwardly from one end of the arbor while the end of the other tool slide projects outwardly from the other end of the arbor: 22, an inwardly projecting tool carried by the outer end of each tool slide and adapted to operate on the bearings of the axle: 23, feed screws journaled longitudinally in the arbor and threaded into the inner ends of the tool slides: 24, star wheels on the outer ends of the feed screws: 25, tappets secured at intervals in the outer ends of the bearing and adapted to be engaged in succession by the star wheels as the journal turns in the bearing: 26, a worm housed in the bearing and engaging the ring-gear: 27, the worm shaft: and 28, a shank on the worm shaft, adapted to be put into connection with a driving apparatus, such, for instance, as a flexible shaft or a portable motor.

This lathe is designed principally for roundhouse use in cases where it is desired to quickly dress the journals of driving axles without recourse to the main repair shop. In applying the device, the lower half of the bearing is to be removed, the arbor removed, bolts 6 and sleeves 7 removed, and centers 4 retracted. The wheel and axle structure is to rest on the floor in natural position and to be properly blocked against rolling. The lathe structure is then to be let down till the centers 4 coincide with the centers in the axle and centers 4 are then to be adjusted inwardly into proper engagement with the axle centers. The hoisting eye being connected with the lathe structure through the medium of a spring permits centers 4 to properly seat in the centers of the axle without bringing extraordinary lifting strains on the wheel and axle structure, in other words, the lathe structure yields downwardly. This act accurately positions the lathe structure so that the bearing will be concentric with the axle. Tight adjustment of the centers 4 would tend to spring the arms of the lathe frame outwardly, and to prevent this the bolts 6 and sleeves 7 are employed, being applied either before or after the centers 4 are adjusted. The bolts 6 prevent the outward springing of the arms of the lathe frame under the influence of centers 4 or otherwise, and sleeves 7 prevent the inward springing of the arms of the lathe frame when the bolts are drawn up. The two half arbors are then to be put in place around the axle after which the lower half-bearing is to be firmly secured in place. Power being applied to shank 28 and the tools being properly adjusted to their work, the dressing of the axle journals proceeds in an obvious manner, both journals being turned at one time.

I claim:—

1. A portable lathe comprising a frame having a pair of outer yokes each of which is adapted to straddle a wheel mounted on an axle and having a central portion to go between the wheels, centers carried by the yoke ends and adapted to engage the axle centers and axle dressing mechanism carried by the central portion of the frame.

2. A portable lathe comprising a frame having a pair of outer yokes adapted to straddle wheels mounted on an axle and having a central portion to go between the wheels, means connecting the outer arms of the yokes with the central portion of the frame and adapted to go between the spokes of the wheels, centers carried by the yoke ends and axle dressing mechanism carried by the central portion of the frame.

3. In a portable lathe, the combination of a frame comprising side yokes adapted to inclose wheels mounted on an axle, a center portion, axle dressing mechanism carried by the center portion of the frame, centers carried by the yokes and a yielding supporting device carried by the frame.

4. In a portable lathe the combination of a frame, centers carried by the frame adapted to engage a piece of work, a yielding device by which the frame may be supported connected with the frame serving to relieve the centers of a portion of the weight of the apparatus, and a tool carried by the frame for operating on the piece of work.

JOHN WILLIAM FLEMMING.

Witnesses:
 FRANK FINERON,
 R. G. CULLIVAN.